(12) United States Patent
Shao et al.

(10) Patent No.: US 11,982,409 B2
(45) Date of Patent: May 14, 2024

(54) SAFETY MONITORING METHODS AND INTERNET OF THINGS SYSTEMS OF PIPE NETWORK RELIABILITY DEGREE BASED ON INTELLIGENT GAS

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Yaqiang Quan, Chengdu (CN); Xiaojun Wei, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/155,121

(22) Filed: Jan. 17, 2023

(65) Prior Publication Data

US 2023/0175652 A1   Jun. 8, 2023

(30) Foreign Application Priority Data

Dec. 7, 2022   (CN) .......................... 202211561845.9

(51) Int. Cl.
  *F17D 5/00* (2006.01)
(52) U.S. Cl.
  CPC ................... *F17D 5/005* (2013.01)
(58) Field of Classification Search
  CPC .......... F17D 5/005; Y02P 90/02; Y02P 90/00; G06Q 10/063114; G06Q 10/0635;
  (Continued)

(56) References Cited

U.S. PATENT DOCUMENTS

| 9,183,527 B1* | 11/2015 | Close .................. G06Q 50/06 |
| 2003/0171879 A1* | 9/2003 | Pittalwala .............. F17D 5/00 702/34 |

(Continued)

FOREIGN PATENT DOCUMENTS

| CN | 104102190 A | 10/2014 |
| CN | 204129516 U | 1/2015 |

(Continued)

OTHER PUBLICATIONS

Notification to Grant Patent Right for Invention in Chinese Application No. 202211561845.9 dated Mar. 8, 2023, 5 pages.

(Continued)

*Primary Examiner* — Mohamed Charioui
(74) *Attorney, Agent, or Firm* — METIS IP LLC

(57) ABSTRACT

The embodiments of the present disclosure provide a safety monitoring method and a safety monitoring Internet of Things system of pipe network reliability degree based on intelligent gas, wherein the method is executed by an intelligent gas pipe network safety management based on the safety monitoring Internet of Things system of pipe network reliability degree, including: obtaining reliability degree influence feature of a pipe network node; and the reliability degree influence feature include at least one of intrinsic features, and extrinsic features; determining reliability degree of the pipe network node based on the reliability degree influence feature; and determining a monitoring scheme based on the reliability degree of the pipe network node. The monitoring scheme includes a key pipe network node to be monitored.

7 Claims, 5 Drawing Sheets

(58) Field of Classification Search
CPC ........ G06Q 10/00; G06Q 50/06; G06Q 50/00; G06Q 50/265
See application file for complete search history.

(56) References Cited

U.S. PATENT DOCUMENTS

| | | |
|---|---|---|
| 2012/0172671 A1 | 7/2012 | Pekarske et al. |
| 2012/0317058 A1 | 12/2012 | Abhulimen |
| 2019/0303791 A1* | 10/2019 | Yoshikawa ............ G06N 20/00 |

FOREIGN PATENT DOCUMENTS

| | | |
|---|---|---|
| CN | 112529265 A | 3/2021 |
| CN | 113033722 | 6/2021 |
| CN | 113915535 A | 1/2022 |
| CN | 115330278 A | 11/2022 |
| CN | 115356978 A | 11/2022 |

OTHER PUBLICATIONS

First Office Action in Chinese Application No. 202211561845.9 dated Feb. 3, 2023, 26 pages.
Guan, Zhongyuan et al., Oil/Gas Pipeline Safety Management and Its Technology Status. Oil & Gas Storage and Transportation, 34(5): 457-463, 2015.
Notification to Grant Patent Right for Invention in Chinese Application No. 202211561845.9 dated Mar. 8, 2023, 2 pages.

* cited by examiner

SAFETY MONITORING METHODS AND INTERNET OF THINGS SYSTEMS OF PIPE NETWORK RELIABILITY DEGREE BASED ON INTELLIGENT GAS

CROSS-REFERENCE TO RELATED DISCLOSURES

This application claims the priority of the Chinese application No. 202211561845.9 filed on Dec. 7, 2022, the entire content of which is incorporated herein by reference.

TECHNICAL FIELD

The present disclosure relates to the field of safety monitoring for gas pipe network, and in particular to a safety monitoring method and an Internet of Things system of pipe network reliability degree based on an intelligent gas.

BACKGROUND

The damage to a gas pipe network not only causes economic losses to the gas company, but also affects the lives of city residents, and in serious cases, can even threaten people's safety. However, with the continuous development of the city, a gas pipe network is subject to extrinsic breakage (e.g., external construction, etc.) more and more frequently, and accounts for an increasing proportion of gas pipe network accidents.

Therefore, it is desirable to provide a method and an Internet of Things system of pipe network reliability degree based on intelligent gas, which is configured to perform the safety monitoring on the gas pipe network, thereby avoiding accidents in the gas pipe network.

SUMMARY

According to one or more embodiments of the present disclosure, a safety monitoring method of pipe network reliability degree based on intelligent gas is provided, the safety monitoring method is executed by an intelligent gas pipe network safety management platform of a safety monitoring Internet of Things system of pipe network reliability degree, including: obtaining a reliability degree influence feature of a pipe network node, wherein the reliability degree influence feature includes at least one of an intrinsic feature or an extrinsic feature; determining reliability degree of the pipe network node based on the reliability degree influence feature; and determining a monitoring scheme based on the reliability degree of the pipe network node, wherein the monitoring scheme includes a key pipe network node to be monitored.

According to one or more embodiments of the present disclosure, a safety monitoring Internet of Things system of pipe network reliability degree is provided, including: an intelligent gas user platform, an intelligent gas service platform, an intelligent gas pipe network safety management platform, an intelligent gas pipe network sensor network platform, and an intelligent gas pipe network object platform, wherein the intelligent gas pipe network object platform is configured to: obtain a reliability degree influence feature of a pipe network node, and transmit the reliability degree influence feature to the intelligent gas pipe network safety management platform through the intelligent gas pipe network sensor network platform; and the reliability degree influence feature includes at least one of an intrinsic feature or an extrinsic feature. And the intelligent gas pipe network safety management platform is configured to: determine reliability degree of the pipe network node based on the reliability degree influence feature; determine a monitoring scheme based on the reliability degree of the pipe network node, wherein the monitoring scheme includes a key pipe network node to be monitored; and transmit the monitoring scheme to the intelligent gas service platform; and the intelligent gas service platform is configured to feed the monitoring scheme back to a user through the intelligent gas user platform.

According to one or more embodiments of the present disclosure, a non-transitory computer-readable storage medium is provided, on which computer instructions are stored, wherein the computer, when reading the computer instructions stored on a storage medium, executes the above safety monitoring method of pipe network reliability degree based on intelligent gas.

BRIEF DESCRIPTION OF THE DRAWINGS

The present disclosure will be further described in the form of exemplary embodiments, which will be described in detail by the accompanying drawings. These embodiments are not limiting, in these embodiments, the same number denotes the same structure, wherein.

DETAILED DESCRIPTION

Figure 1:
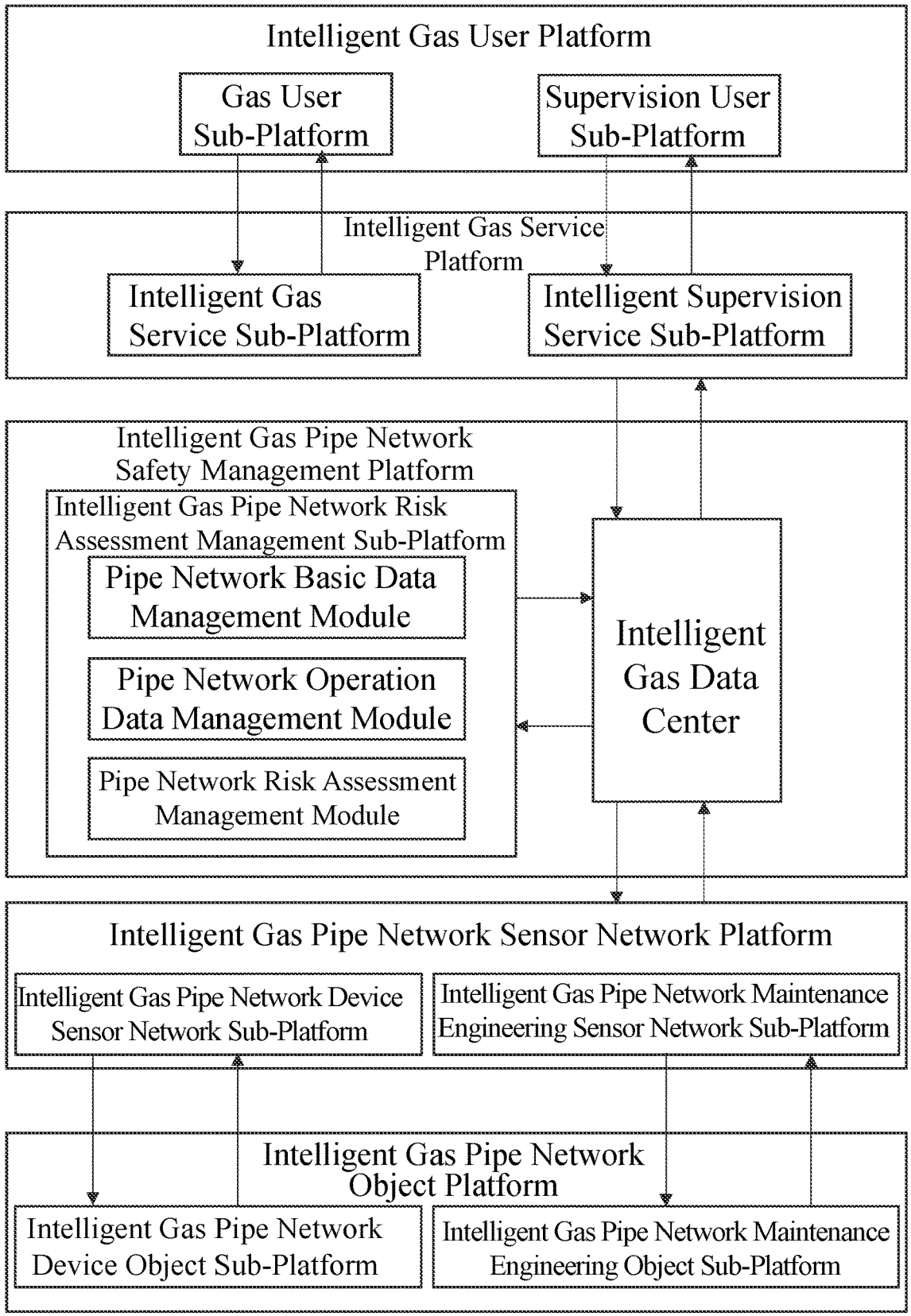
FIG. 1 is a schematic diagram illustrating a safety monitoring Internet of Things system of pipe network reliability degree shown according to some embodiments of the present disclosure.

To more clearly illustrate the technical solutions related to the embodiments of the present disclosure, a brief introduction of the drawings referred to the description of the embodiments is provided below. Obviously, the accompanying drawing in the following description is merely some examples or embodiments of the present disclosure, for those skilled in the art, the present disclosure may further be applied in other similar situations according to the drawings without any creative effort. Unless obviously obtained from the context or the context illustrates otherwise, the same numeral in the drawings refers to the same structure or operation.

It will be understood that the term "system," "device," "unit," and/or "module" used herein are one method to distinguish different components, elements, parts, sections, or assemblies of different levels in ascending order. However, if other words may achieve the same purpose, the words may be replaced by other expressions.

As used in the disclosure and the appended claims, the singular forms "a," "an," and "the" include plural referents unless the descriptions clearly dictate otherwise. Generally speaking, the terms "comprise" and "include" only imply that the clearly determined steps and elements are included, and these steps and elements may not constitute an exclusive list, and the method or device may further include other steps or elements.

Flowcharts are used throughout the present disclosure to illustrate the operations performed by the system according to embodiments of the present disclosure. It should be understood that the preceding or following operations are not necessarily performed in precise order. Instead, the individual steps may be processed in reverse order or simultaneously. It is also possible to add other operations to these processes or to remove a step or steps of operations from these processes.

FIG. 1 is a schematic diagram illustrating a safety monitoring Internet of Things system of pipe network reliability degree shown according to some embodiments of the present disclosure.

As shown in FIG. 1, a safety monitoring Internet of Things system 100 may include an intelligent gas user platform, an intelligent gas service platform, an intelligent gas pipe network safety management platform, an intelligent gas pipe network sensor network platform, and an intelligent gas pipe network object platform.

The intelligent gas user platform may be a platform that is driven by a user to obtain the user requirement and feed information back to the user. In some embodiments, the intelligent gas user platform may be configured as a terminal device. For example, a desktop computer, a tablet computer, a laptop computer, a cell phone, and other intelligent electronic devices that realize data processing and data communication.

In some embodiments, the intelligent gas user platform may include a gas user sub-platform and a supervision user sub-platform. The gas user sub-platform, serving gas users, is configured to receive gas-related data and gas problem solutions from the intelligent gas service sub-platform, and send gas-related data instructions and gas problem solutions instructions to the intelligent gas service sub-platform. The supervision user sub-platform, serving supervision users (e.g., users of safety supervision departments) may be configured to receive risk reminder information and monitoring schemes (e.g., network maintenance, inspection, inspection strategies, etc.) from the intelligent supervision service sub-platform, and send pipe network risk assessment information instructions and the monitoring schemes to the Intelligent supervision service sub-platform.

The intelligent gas service platform may be a platform for receiving and transmitting data and/or information. For example, the intelligent gas service platform can be configured to receive gas problem solutions uploaded by the intelligent gas data center of the intelligent gas network safety management platform, and send the gas problem solutions to the intelligent gas user platform. In some embodiments, the intelligent gas service platform may be configured to receive the instructions (e.g., gas-related data query instructions, pipe network risk assessment information query instructions, etc.) from the intelligent gas user platform, and to send the instructions to the intelligent gas data center of the intelligent gas pipe network safety management platform.

In some embodiments, the intelligent gas service platform may include an intelligent gas service sub-platform and an intelligent supervision service sub-platform. The intelligent gas service sub-platform may be configured to receive gas-related data and gas problem solutions uploaded by the intelligent gas data center of the intelligent gas pipe network safety management platform, and transmit the gas-related data and the gas problem solutions to the gas user sub-platform. The intelligent gas service sub-platform may further be configured to receive gas-related data query instructions sent by the gas user sub-platform, and send the gas-related data query instructions to the intelligent gas data center of the intelligent gas network safety management platform. The intelligent gas service sub-platform may further be configured to receive gas-related data query instructions from the gas user sub-platform and send gas-related data query instructions to the intelligent gas data center of the intelligent gas network safety management platform. The intelligent supervision service sub-platform may be configured to receive the pipe network risk reminder information and monitoring scheme uploaded by the intelligent gas data center of the intelligent gas pipe network safety management platform, and transmit the pipe network risk reminder information and monitoring scheme to the supervision user sub-platform. The intelligent supervision service sub-platform may further be configured to receive the pipe network risk assessment information query instructions sent by the supervision user sub-platform, and send the pipe network risk assessment information query instructions to the intelligent gas data center of the intelligent gas pipe network safety management platform.

The intelligent gas pipe network safety management platform may refer to a platform that arranges and coordinates the connection and collaboration between a plurality of functional platforms, converges all the information of the Internet of Things, and provides functions of perception management and control management for the Internet of Things operation system. For example, the intelligent gas pipe network safety management platform may be configured to receive the reliability degree influence feature of the pipe network node (e.g., pipe network environment, pipe network pressure, etc.) transmitted by the intelligent gas pipe network sensor network platform, assess the risk of the network, and determine the monitoring scheme.

In some embodiments, the intelligent gas pipe network safety management platform may include an intelligent gas pipe network risk assessment management sub-platform and an intelligent gas data center. The intelligent gas pipe network risk assessment management sub-platform may include a pipe network basic data management module, a pipe network operation data management module, and a pipe network risk assessment management module.

The pipe network basic data management module may be configured to manage the basic data information of the pipe network, such as the pipe network environment, pipe network service life, the material of the pipe network, and other information. The pipe network operation data management module may be configured to manage pipe network operation data information, such as pipe network pressure, leakage data, maintenance situation, and other information. The pipe network risk assessment management module may be configured to assess the risk to the pipe network based on the pipe network basic data and the pipe network operation data. For example, the pipe network risk assessment management module may be configured to assess the risk of pipe network safety through preset models (such as machine learning models, etc.) based on the pipe network basic data and pipe network operation data, and classify the risk level according to the risk assessment to perform three-dimensional visual management with different color differentiation in combination with the Geographic Information System (GIS).

In some embodiments, the intelligent gas data center may be configured to receive the reliability degree influence feature of the pipe network node sent by the intelligent gas pipe network sensor network platform, and send the data to the intelligent gas pipe network risk assessment management sub-platform for processing. After finishing processing, the intelligent gas pipe network risk assessment management sub-platform sends the data to the intelligent gas data center. The intelligent gas data center aggregates and stores the processed data and sends it to the intelligent gas service platform, and transmits the processed data to the intelligent gas user platform through the intelligent gas service platform. In some embodiments, the intelligent gas data center may further be configured to receive instructions from the intelligent gas service platform and send them to the intelligent gas network sensor network platform.

An intelligent gas pipe network sensor network platform may refer to a platform for processing, storing, and transmitting data and/or information. For example, the intelligent gas pipe network sensor network platform may be configured to receive a reliability degree influence feature of the pipe network node obtained by the intelligent gas pipe network object platform, and transmit the reliability degree influence feature of the pipe network node to the intelligent gas data center. In some embodiments, the intelligent gas pipe network sensor network platform may be configured as a communication network and gateway.

In some embodiments, the intelligent gas pipe network sensor network platform may include an intelligent gas pipe network device sensor network sub-platform and an intelligent gas pipe network maintenance engineering sensor network sub-platform. The intelligent gas pipe network device sensor network sub-platform may be configured to receive the reliability degree influence feature of the pipe network node from the intelligent gas pipe network device object sub-platform (e.g., pipelines, etc.) and send them to the intelligent gas data center. The intelligent gas pipe network device sensor network sub-platform may further be configured to receive reliability degree influence feature instructions of the pipe network node from the intelligent gas data center, and send the reliability degree influence feature instructions to the Intelligent gas pipe network device object sub-platform. The intelligent gas pipe network maintenance engineering sensor network sub-platform may be configured to receive remote scheduling management information from the intelligent gas data center, and transmit it to the intelligent gas pipe network maintenance engineering object sub-platform. The intelligent gas pipe network maintenance engineering sensor network sub-platform may further be configured to receive execution feedback from an intelligent gas pipe network maintenance engineering object sub-platform to remote scheduling management information from, and upload the execution feedback to the intelligent gas data center.

The intelligent gas pipe network object platform may be a functional platform for obtaining data and/or information related to the pipe network object. For example, the intelligent gas pipe network object platform may be configured to obtain the reliability degree influence feature of the pipe network node and transmit it to an intelligent gas data center through an intelligent gas pipe network sensor network platform. In some embodiments, the intelligent gas pipe network object platform may be configured as a plurality of classifications of pipe network devices.

In some embodiments, the intelligent gas pipe network object platform may include an intelligent gas pipe network device object sub-platform and an intelligent gas pipe network maintenance engineering object sub-platform. The intelligent gas pipe network device object sub-platform may be configured to receive reliability degree influence feature instructions of the pipe network node transmitted by the intelligent gas pipe network sensor network platform, and when obtaining the reliability degree influence feature of the pipe network node, upload it to the intelligent gas data center through the intelligent gas pipe network sensor network platform. The intelligent gas pipe network maintenance engineering object sub-platform may perform corresponding maintenance on the pipe network device based on the remote scheduling management information transmitted by the intelligent gas pipe network sensor network platform, and feedback the execution results back to the intelligent gas data center through the intelligent gas pipe network sensor network platform.

In some embodiments of the present disclosure, the pipe network reliability degree safety monitoring system is built through the Internet of Things function system of five platforms, wherein the intelligent gas pipe network safety management platform is arranged by using a combination of sub-platforms and data centers, and the intelligent gas user platform, the intelligent gas service platform, the intelligent gas pipe network sensor network platform and the intelligent gas pipe network object platform are arranged by using multiple sub-platforms, which can ensure independence between different classifications of data, ensure data classification transmission and traceability and the classification of instructions issuance and processing, make the Internet of Things structure and data processing clear and controllable, and facilitate the control and data processing of the Internet of Things.

It should be noted that the above description of the safety monitoring Internet of Things system of the pipe network reliability degree and its modules is for descriptive convenience only and does not limit the present disclosure to the scope of the cited embodiments. It can be understood that for those skilled in the art, after understanding the principle of the system, it may be possible to make any combination of individual modules or form a subsystem to connect with other modules without departing from this principle. In some embodiments, the intelligent gas user platform, the intelligent gas service platform, the intelligent gas pipe network safety management platform, the intelligent gas pipe network sensor network platform, and the intelligent gas pipe network object platform disclosed in FIG. 1 may be different modules in one system, or one module may implement the functions of two or more of the above modules. For example, each module may share a storage module, and each module may further have its storage module. Variations such as these are within the scope of protection of the present disclosure.

Figure 2:
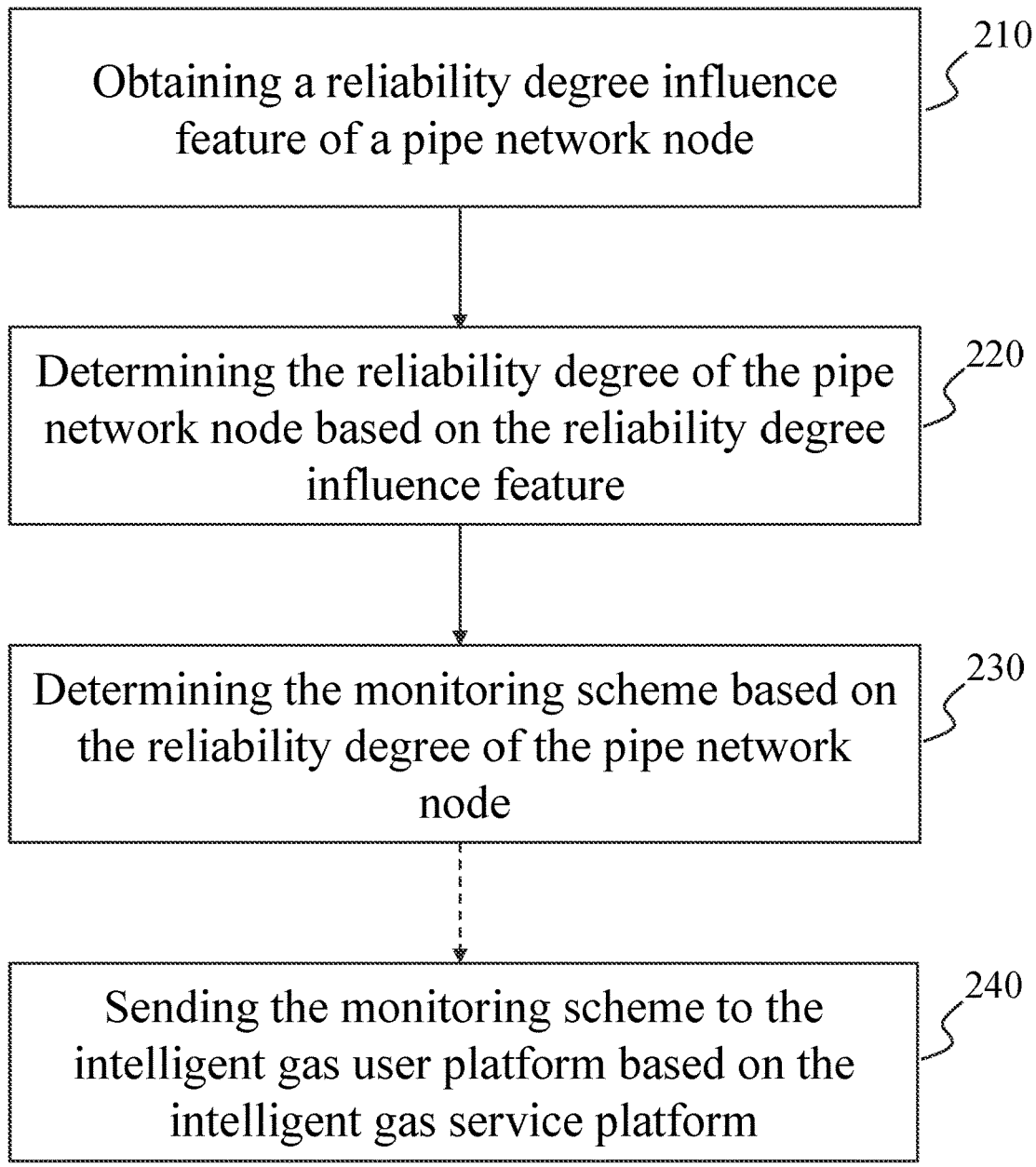
FIG. 2 is an exemplary flowchart illustrating a safety monitoring method of pipe network reliability degree based on intelligent gas according to some embodiments of the present disclosure.

FIG. 2 is an exemplary flowchart illustrating a safety monitoring method of pipe network reliability degree based on intelligent gas according to some embodiments of the present disclosure. As shown in FIG. 2, process 200 includes the steps described below. In some embodiments, process 200 may be performed by an intelligent gas pipe network safety management platform of a safety monitoring Internet of Things system of the pipe network reliability degree.

Step 210, obtaining a reliability degree influence feature of a pipe network node.

The pipe network node may be a monitoring node for gas pipelines in a gas network. For example, connections of gas pipelines, arbitrary locations in gas pipelines, etc.

The reliability degree influence feature may refer to a relevant feature that affects the safety reliability degree of the gas pipe network node. In some embodiments, the reliability degree influence feature may include at least one of an intrinsic feature and an extrinsic feature.

The intrinsic feature may refer to a feature related to the gas pipe network itself. In some embodiments, the intrinsic feature may include a pipe network feature, an operation feature, and a maintenance feature. The network feature may be a feature related to a pipe network pipe, such as the operation life of the pipe, the material of the pipe, the length of the pipe, and other features. The operation feature may refer to the pipe network operation parameters, such as the rated flow rate at each node, air pressure, and the actual flow rate at each node. The maintenance feature may refer to a feature related to the maintenance of the pipe network, such as frequency of maintenance, time of the last maintenance, etc. More descriptions regarding the intrinsic feature may be found in FIG. 3 and its related descriptions.

The extrinsic feature may be a feature related to the environment surrounding the gas pipe network. In some embodiments, the extrinsic feature may include a climate feature and a construction feature. The climate feature may refer to a feature related to the climate, such as ambient temperature, ambient humidity, etc. The construction feature may refer to a feature related to external construction conditions, such as the expected construction schedule, actual construction schedule, construction personnel number, construction scope, etc. More descriptions regarding the extrinsic feature may be found in FIG. 3 and its related descriptions.

The reliability degree influence feature of the pipe network node may be obtained in a plurality of ways. In some embodiments, the intelligent gas data center of the intelligent gas pipe network safety management platform may obtain the reliability degree influence feature of the pipe network node based on the intelligent gas pipe network device object sub-platform of the intelligent gas pipe network object platform. The intelligent gas pipe network device object sub-platform may be configured with a monitoring device of the pipe network device for obtaining the reliability degree influence feature of the pipe network node. For example, the intelligent gas pipe network device object sub-platform may use a pressure sensor and a temperature sensor to obtain the pressure within the gas pipeline segment and the ambient temperature around the gas pipeline, respectively.

Step 220, determining the reliability degree of the pipe network node based on the reliability degree influence feature.

The reliability degree may be configured to describe the probability of an accident occurring in a gas pipe network. The higher the reliability degree, the safer the pipe network node and the lower the probability of an accident. The reliability degree of a pipe network node may be indicated based on a variety of ways, such as numerical values or ratings. In some embodiments, the reliability degree of the pipe network node may be indicated based on a numerical value between 0 and 100%. In some embodiments, the reliability degree of the pipe network node may further be indicated based on a ranking A larger value or a higher reliability degree level indicates a higher safety of the gas network and a lower probability of an accident. The rules of the grade classification may be determined based on the actual situation.

In some embodiments, the reliability degree of the pipe network node may be determined based on the historical data of the pipe network node. For example, if only 2 incidents have occurred in the historical data of the pipe network node, the reliability degree of the pipe network node may be considered to be 98% based on preset conversion rules. The historical data may be a collection of all historical data including the reliability degree influence feature of the pipe network node.

In some embodiments, the intelligent gas data center transmits the reliability degree influence feature data of the pipe network node to the intelligent gas pipe network risk assessment management sub-platform, and the intelligent gas pipe network risk assessment management sub-platform may implement a plurality of ways to determine the reliability degree of the pipe network node based on the reliability degree influence feature. For example, the intelligent gas pipe network risk assessment management sub-platform can determine the reliability degree of a pipe network node by comparing the reliability degree influence feature of the node with the reference reliability degree influence feature. The higher the similarity with the reference reliability degree influence feature, the higher the reliability degree of the pipe network node. The reference reliability degree influence feature may be the relevant feature when the gas pipe network is in safe operation. For example, the flow rate and the air pressure in the pipeline when the gas pipe network is in safe operation.

In some embodiments, the reliability degree of the pipe network node may be determined based on an intrinsic reliability degree and an extrinsic reliability degree. For example, the intrinsic and extrinsic reliability degree can be performed as a weighted summation to determine the reliability degree of the pipe network node, and the weight may be determined based on the ratio of the incident numbers due to the intrinsic and extrinsic factors in historical incidents. The historical incidents may be a set of all past incidents. The intrinsic factors may be factors related to the pipe network itself, such as the aging of pipe network materials. The extrinsic factors may be factors related to the environment around the pipe network, such as the gas pipe network breakage caused by the excessive depth of construction. For another example, it may take an average value of the intrinsic reliability degree and the extrinsic reliability degree to determine the reliability degree of the pipe network node.

Figure 3:
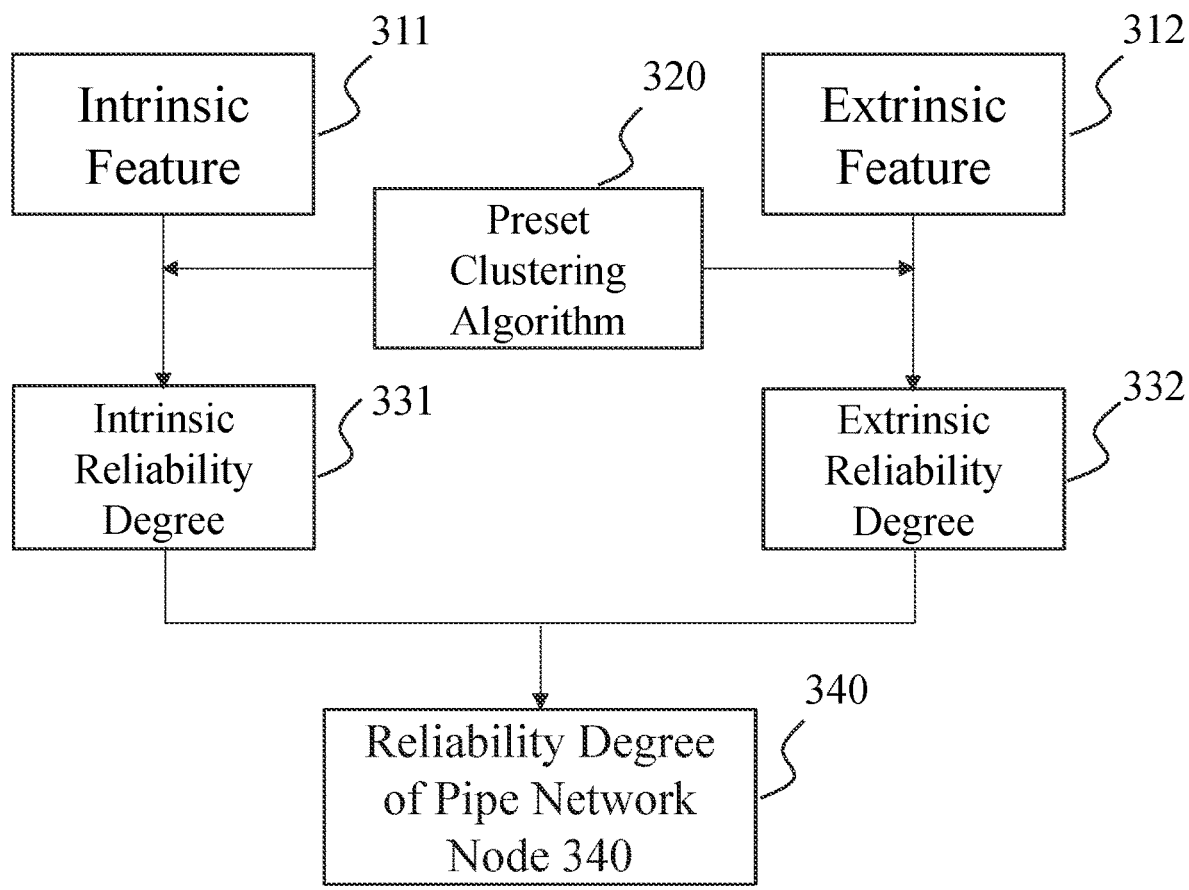
FIG. 3 is a schematic diagram illustrating a method of reliability degree determination of a pipe network node according to some embodiments of the present disclosure.

More descriptions regarding how to determine the intrinsic reliability degree and the extrinsic reliability degree and how to determine the reliability degree of the pipe network node based on the intrinsic reliability degree and the extrinsic reliability degree may be found in FIG. 3 and its related descriptions.

Step 230, determining the monitoring scheme based on the reliability degree of the pipe network node.

A monitoring scheme may be a scheme for monitoring the gas pipe network, including but not limited to a monitoring period, a monitoring frequency, etc. For example, when the reliability degree of a certain pipe network node is found to be in a decreasing trend, the monitoring scheme for it may be a new scheme obtained by extending the monitoring period, increasing the monitoring frequency, etc., based on the original monitoring scheme. For example, when the reliability degree of a pipe network node is found to be stable, the monitoring scheme can be a new scheme that reduces the monitoring frequency based on the original monitoring scheme. In some embodiments, the monitoring scheme may include a key pipe network node to be monitored.

A key pipe network node may refer to a pipe network node with a low reliability degree. In some embodiments, a low reliability degree may refer to a reliability degree that is below a preset reliability degree threshold. For example, the preset reliability degree threshold is 55%, and when the reliability degree is less than 55% (e.g., the reliability degree is 54%), the pipe network node may be considered as a key pipe network node. The key pipe network node is more prone to occur accidents in subsequent applications, thus it needs to be monitored in a focused manner. More descriptions of how to determine the key pipe network node may be found in FIG. 4 and its related descriptions.

In some embodiments, the monitoring scheme may further include data collection accuracy, for example, when the reliability degree of a pipe network node is near a preset reliability degree threshold, the data collection accuracy may be increased to better determine a monitoring scheme for the reliability degree of the pipe network node. More descriptions regarding the receipt collection accuracy may be found in FIG. 5 and its related descriptions.

In some embodiments, the monitoring scheme may be determined based on manual analysis. For example, when the reliability degree of a pipe network node is below a reliability degree threshold of 55%, the node is a key pipe network node, and the gas company analyzes the reliability degree influence feature of the node and gives a monitoring scheme with a monitoring frequency of 50 times/day and a monitoring period of 1 week, which can be indicated as (50, 1).

In some embodiments, the reliability degree influence feature of the pipe network node may be obtained based on the intelligent gas data center, and the intelligent gas data center transmits the reliability degree influence feature of the pipe network node to the intelligent gas pipe network risk assessment management sub-platform, which determines a monitoring scheme. The intelligent gas pipe network risk assessment management sub-platform can preset various monitoring schemes based on the reliability degree of the pipe network node. For example, when 55%<reliability degree of the pipe network node≤60%, the corresponding monitoring scheme is (20, 1); when 50%<reliability degree of the pipe network node≤55%, the corresponding monitoring scheme is (50, 1), etc. The monitoring scheme corresponding to the reliability degree of the current pipe network node may be determined based on the range interval where the reliability degree of the current pipe network node is located, In some embodiments, process 200 may further include the following steps.

Step 240, sending the monitoring scheme to the intelligent gas user platform based on the intelligent gas service platform.

In some embodiments, after the intelligent gas pipe network risk assessment management sub-platform determines a monitoring scheme, the monitoring scheme may be transmitted through the intelligent gas data center to the intelligent gas service platform, and the intelligent gas service platform sends the monitoring scheme to the supervision user sub-platform of the intelligent gas user platform again. The supervision user may obtain the monitoring scheme in the intelligent gas user platform.

In some embodiments of the present disclosure, the safety monitoring Internet of Things system based on the pipe network reliability degree of the intelligent gas realizes the determination and transmission of the monitoring scheme to facilitate the regulatory user to timely obtain the monitoring scheme to enhance monitoring to the pipe network node with the low reliability degree, which can enable regulatory users to take countermeasures in advance to avoid gas pipe network accidents and ensure the safety of the gas pipe network.

It should be noted that the above description of process 200 is for example and illustration purposes only and does not limit the scope of application of the present disclosure.

For those skilled in the art, various amendments and changes can be made to process 200 under the guidance of the present disclosure. However, these amendments and changes remain within the scope of the present disclosure.

FIG. 3 is a schematic diagram illustrating a method of reliability degree determination of a pipe network node according to some embodiments of the present disclosure.

As shown in FIG. 3, a reliability degree of pipe network node 340 may be determined based on an intrinsic reliability degree 331 and an extrinsic reliability degree 332.

In some embodiments, the intelligent gas data center transmits reliability degree influence feature data of a pipe network node to an intelligent gas pipe network risk assessment management sub-platform, and the intelligent gas pipe network risk assessment management sub-platform may implement a plurality of ways to determine the reliability degree of the pipe network node based on the intrinsic reliability degree and the extrinsic reliability degree. For example, the intelligent gas pipe network risk assessment management sub-platform can take the average value of the intrinsic reliability degree and the extrinsic reliability degree as the reliability degree of the pipe network node.

In some embodiments, the intelligent gas network safety management platform may perform a weighted summation of the intrinsic reliability degree and the extrinsic reliability degree to determine the reliability degree of the network node.

In some embodiments, the weight of an intrinsic reliability degree is determined by the percentage of accidents caused by intrinsic factors, the weight of the extrinsic reliability degree is determined by the percentage of accidents caused by extrinsic factors, and the ratio of the number of accidents caused by intrinsic and extrinsic factors can be obtained by manual statistics. For example, if 60% of the accidents are caused by intrinsic factors and 40% by extrinsic factors, the weight of the intrinsic reliability degree may be determined as 0.6 and the weight of an extrinsic reliability degree as 0.4.

In some embodiments, the degree of reliability degree includes an intrinsic degree of reliability degree. In some embodiments, the intelligent gas pipe network safety management platform may determine the intrinsic reliability degree 331 based on an intrinsic feature 311.

The intrinsic feature includes the pipe network feature, the operation feature, and the maintenance feature. More descriptions regarding the intrinsic feature may be found in FIG. 2 and its related descriptions.

In some embodiments, the pipe network feature may be obtained directly from a storage device or database. For example, the operation years and the pipeline feature of the gas network, etc. are obtained directly from the storage device or the database. In some embodiments, the operation feature may be obtained from the storage device, the database, or a sensor. For example, the rated operation parameters of the gas pipe network (e.g., preset temperature, air pressure parameters, etc.) are obtained directly from the storage device or the database, and the actual operation parameters are obtained through sensors (e.g., obtaining actual gas flow rate through flow meters, obtaining actual temperature through thermometers, obtaining actual air pressure through pressure sensors, etc.). In some embodiments, the maintenance feature may be obtained directly from the storage device or the database. For example, the frequency of maintenance may be obtained directly from the storage device or the database, etc.

In some embodiments, the intelligent gas pipe network safety management platform may obtain at least some of the intrinsic features based on the collection frequency. For example, the intelligent gas pipe network safety management platform may obtain the actual operation parameters based on the collection frequency, etc.

The collection frequency is the frequency of data collection, which can be indicated in terms of how many times it is obtained over a period of time, e.g., 1 time/week, etc.

The operation frequency of construction refers to the frequency with which the builder (e.g., municipal road repair team, etc.) works in a gas pipe network area, which can be indicated by using the length of construction over a period of time, e.g., 12 hours/day, etc. The operation is a construction operation such as tilling of the soil, drilling of holes, etc. that may affect the safety of the pipe network node. In some embodiments, construction site information may be collected by the sensor to determine the frequency of construction operations. For example, image recognition through a camera device is configured to determine the operation frequency of construction, or on-site construction sounds are captured through a recording device to determine the operation frequency of construction, etc.

In some embodiments, the collection frequency is related to the operation frequency of the construction. For example, the collection frequency is positively related to the operation frequency of construction, the higher the operation frequency of construction, the higher the collection frequency. The operation frequency of construction may map the collection frequency. For example, an operation frequency of 0 hours/day-6 hours/day of construction corresponds to a collection frequency of 1 time/week, an operation frequency of 6 hours/day-12 hours/day of construction corresponds to a collection frequency of 2 times/week, an operation frequency of 12 hours/day-18 hours/day of construction corresponds to a collection frequency of 3 times/week, and an operation frequency of 18 hours/day-24 hours/day of construction corresponds to a collection frequency of 4 times/week.

In some embodiments, the intelligent gas network safety management platform may determine the collection frequency based on the operation frequency of the construction and obtain at least some of the intrinsic features based on the collection frequency. For example, if the operation frequency of the construction is 10 hours/day, the collection frequency is determined to be 2 times/week, and the actual operation parameters are obtained through the sensor twice a week.

The construction may affect the safe operation of the gas pipe network. The higher the operation frequency of construction, the higher the frequency of vibration/damage to the ground and soil in the gas pipe network area, and the higher the frequency with which the construction process may affect the underground gas pipe network. To improve the accuracy of the collected data, it is, therefore, necessary to increase the corresponding collection frequency.

The intrinsic reliability degree is configured to describe the probability of an accident occurring in a gas pipe network due to intrinsic feature. For example, the intrinsic reliability degree includes the probability of an accident occurring due to a network feature (e.g., an operation age, a pipe feature, etc.), an operation feature (e.g., actual temperature and pressure at each point, etc.), and a maintenance feature (e.g., frequency of maintenance, etc.). The higher the intrinsic reliability degree, the lower the probability that an accident will occur due to the intrinsic feature of the gas network. The representation of the intrinsic reliability degree may be seen in FIG. 2 for the representation of reliability degree.

In some embodiments, the intelligent gas pipe network safety management platform may calculate a vector distance to a historical instance based on the intrinsic feature, and determine the intrinsic reliability degree of the nearest historical instances as the intrinsic reliability degree of the current pipe network node. The historical instance refers to the data of a pipe network node in history. The historical instances may include: the classification of the accident that occurred, the cause of the accident (configured to determine whether the accident was caused by the intrinsic feature or the extrinsic feature), the intrinsic feature and the extrinsic feature at the time of the accident or at a time or a time period before the accident. The historical instances may be stored on a storage device or in a database.

In some embodiments, the intelligent gas pipe network safety management platform may determine the intrinsic reliability degree 331 based on the intrinsic feature 311 through a preset clustering algorithm 320.

The preset clustering algorithm is a preset clustering algorithm configured to determine the intrinsic reliability degree or the extrinsic reliability degree. The classifications of clustering algorithms can include a plurality of classifications, such as K-Means (K-means) clustering, density-based clustering methods (DBSCAN), etc.

In some embodiments, the historical instances are divided into two broad classifications corresponding to the intrinsic feature and the extrinsic feature, i.e., the instance set of accidents due to the intrinsic feature and the instance set of accidents due to the extrinsic feature. In the instance set of accidents due to intrinsic feature, the instances of accidents due to intrinsic features are clustered by a clustering algorithm to obtain several classifications. The instances of accidents due to intrinsic features can be represented by an intrinsic feature vector, and the elements in the intrinsic feature vector can correspond to the parameter values of the intrinsic feature. For example, the intrinsic feature vector may be (a, b, c, d, e, f, g), where a may indicate the operation life of the pipeline, b may indicate the material of the pipeline, c may indicate the length of the pipeline, d may indicate the rated flow rate of each node, e may indicate the actual flow rate of each node, f may indicate the frequency of servicing, and g may indicate the time of the last servicing. In some embodiments, the intelligent gas pipe network safety management platform may cluster the set of intrinsic feature vectors by a clustering algorithm and determine the clustering centers of each clustered set.

In some embodiments, the above clustering processing may be performed after a preset number of clustering centers, for example, 3 clustering centers are preset, i.e., the instances in the instance set of accidents due to intrinsic features are clustered to obtain 3 classifications. In some embodiments, the above-preset number of clustering centers may be set according to the actual situation.

In some embodiments, the instance set of incidents due to intrinsic features may include one or more clustering centers. The clustering centers may indicate classifications of an intrinsic feature. In some embodiments, the intelligent gas pipe network safety management platform may determine a first set of clustering centers by clustering an instance set of incidents caused due to the intrinsic feature of a clustering algorithm.

In some embodiments, when a new instance of an incident due to an intrinsic feature is generated, a corresponding new intrinsic feature vector may be constructed based on the new instance, and then the cluster to which the new instance belongs may be determined based on a vector distance between the new intrinsic feature vector and the intrinsic feature vector corresponding to each cluster center in the instance set. For example, the new instance may belong to the cluster in which the cluster center with the smallest vector distance therefrom is located, wherein the methods for calculating the vector distance may include but are not limited to, Euclidean distance, cosine distance, Marxian distance, Chebyshev distance, and/or Manhattan distance, etc.

In some embodiments, a pipe network node may be classified into one of the classifications in the instance set of incidents due to the intrinsic feature described above based on the intrinsic feature. For example, the vector distance between the intrinsic feature of the pipe network node and the intrinsic feature of the cluster center is calculated, and it is classified into the corresponding classification with the closest distance to the cluster center. The intrinsic reliability degree is then determined based on the intrinsic reliability degree of the historical instances in the class. For example, the intrinsic reliability degree of each historical instance contained in the classification is averaged as the intrinsic reliability degree.

In some embodiments, the intrinsic reliability degree of the historical instances may be determined based on the interval of the duration of the incident due to the intrinsic feature. The intrinsic feature of each historical instance corresponds to the feature at a certain moment in time. For example, for a certain historical instance, the intrinsic feature of the historical instance corresponds to a moment t0. If an accident due to the intrinsic feature occurs at the construction site where the historical instances are located at the same time as the moment t0 (or within a very short time, such as 1 hour, etc.), the intrinsic reliability degree of the historical instances can be very low (e.g., 0); if the accident due to intrinsic features occurred at the construction site where the historical instances are located after a long time, or even if the accident due to intrinsic features never occurred, then the intrinsic reliability degree of the historical instances is high (e.g., close to 1).

In some embodiments, the intrinsic reliability degree may be determined based on the weighted summation of the intrinsic reliability degree of the historical instances in the clusters. In some embodiments, the weight of the intrinsic reliability degree of the historical instances is related to the historical data collection accuracy corresponding to the historical instances.

The historical data collection accuracy refers to the fineness of collecting historical data, which may include the frequency of collecting historical data, whether collecting historical data is comprehensive, etc. The historical data collection accuracy may be divided by level, and the higher the level means the higher the historical data collection accuracy, and the upper limit of the level can be set, such as level 10. In some embodiments, the historical data collection accuracy can be obtained by consulting from the data collection records or obtained from a storage device or database storing the historical data collection accuracy.

In some embodiments, the weight of the intrinsic reliability degree of the historical instances in the clusters may be positively related to the historical data collection accuracy. For example, if the clusters contain historical instance 1, historical instance 2, and historical instance 3, wherein the historical instance 1 has a historical data collection accuracy of level 2, historical instance 2 has a historical data collection accuracy of level 3, and historical instance 3 has a historical data collection accuracy of level 5, the intrinsic reliability degree weight of historical instance 1 is 0.2, the intrinsic reliability degree weight of historical instance 2 is 0.3, and the intrinsic reliability degree of historical instance 3 is 0.5. The intrinsic reliability degree of the historical instances in the cluster is 0.2*intrinsic reliability degree of historical instance 1+0.3*intrinsic reliability degree of historical instance 2+0.5*intrinsic reliability degree of historical instance 3.

The intrinsic reliability degree is determined based on the weighted summation of the intrinsic reliability degree of the historical instances in the clusters. This determination method takes into account the historical data collection accuracy, which makes the factors considered when determining the intrinsic reliability degree more comprehensive, and the data collection accuracy is related to the data accuracy, which also makes the determined intrinsic reliability degree more accurate.

In some embodiments, the reliability degree includes an extrinsic reliability degree. In some embodiments, the intelligent gas pipe network safety management platform may determine an extrinsic reliability degree 332 based on the extrinsic feature 312.

In some embodiments, the extrinsic feature includes climate feature, construction feature, etc. The climate feature is configured to indicate climate-related factors such as average hours of sunlight, temperature, humidity, etc. The climate feature may further be a sequence of climate features composed of a plurality of moments. The construction feature is configured to indicate the construction-related feature, such as the expected construction schedule, actual construction schedule, construction personnel number, construction device, construction scope, etc. The construction scope may include construction depth and construction area, etc. In some embodiments, the construction feature further includes the operation frequency of the construction. More descriptions regarding the operation frequency of construction may be found in the related descriptions above.

The construction feature in the extrinsic feature includes the operation frequency of construction, which may describe the construction feature in more detail and make the construction feature data more comprehensive, so that the reliability degree of the extrinsic reliability degree determined based on the extrinsic feature is more reliable.

In some embodiments, the climate feature may be obtained from sensors deployed in the environment surrounding the gas pipe network. For example, the ambient temperature is obtained through a thermometer, the duration of sunlight exposure is obtained through a light level sensor, etc. In some embodiments, the construction feature may be determined from information pre-reported by the construction team. For example, the construction team pre-reports the expected construction schedule, the actual construction schedule, the construction personnel number, the construction device, the construction scope, etc.

The extrinsic reliability degree is configured to describe the probability of an accident occurring in a gas pipe network due to extrinsic feature. For example, the extrinsic reliability degree includes the probability of an accident occurring due to climatic feature (e.g., ambient temperature, humidity, etc.) and construction feature (e.g., the scope of construction, construction device, etc.). The higher the extrinsic reliability degree, the lower the probability that an accident will occur in the gas network due to extrinsic feature. The representation of the extrinsic reliability degree may be found in FIG. 2 for the representation of reliability degree.

In some embodiments, the intelligent gas pipe network safety management platform may calculate the vector distances to historical instances based on the extrinsic feature, and determine the extrinsic reliability degree of the nearest historical instances as the extrinsic reliability degree of the current pipe network node. The historical instances may be found in the related descriptions above.

In some embodiments, the intelligent gas pipe network safety management platform may determine the extrinsic reliability degree 332 based on the extrinsic feature 312 through a preset clustering algorithm 320. The preset clustering algorithm may be found in the related descriptions above.

As mentioned above, the historical instances may be divided into two broad classifications (i.e., the instance set of accidents due to intrinsic features and the instance set of accidents due to extrinsic features). In some embodiments, in the instance set of accidents due to extrinsic feature, the instances of accidents due to extrinsic features are clustered by a clustering algorithm to obtain the number of classifications. The instances of accidents due to extrinsic features may be indicated by the extrinsic feature vector, and the elements in the extrinsic feature vector may correspond to parameter values of the extrinsic feature. For example, the extrinsic feature vector may be (a, b, c, d, e, f), wherein a may indicate the ambient temperature, b may indicate the ambient humidity, c may indicate the expected construction progress, d may indicate the actual construction progress, e may indicate the construction personnel number, and f may indicate the construction range. In some embodiments, the intelligent gas pipe network safety management platform may cluster the set of extrinsic feature vectors by a clustering algorithm and determine the clustering centers of each clustering set. In some embodiments, the above clustering process may be performed after a preset number of clustering centers, for example, 2 clustering centers are preset, i.e., the instances in the instance set of incidents due to extrinsic features are clustered to obtain 2 classifications. In some embodiments, the above preset number of clustering centers can be set according to the actual situation.

In some embodiments, one or more clustering centers may be included in the instance set of incidents due to the extrinsic feature. The clustering center may represent a classification of the extrinsic feature. In some embodiments, the intelligent gas pipe network safety management platform may cluster the instance set of incidents due to the extrinsic feature by a clustering algorithm to determine a first set of clustering centers.

In some embodiments, when a new instance of an incident due to an extrinsic feature is created, a corresponding new extrinsic feature vector can be constructed based on the new instance, and then the cluster to which the new instance belongs may be determined based on the vector distance between the new extrinsic feature vector and the extrinsic feature vector corresponding to each cluster center in the instance set, for example, the new instance may belong to the cluster to which the cluster center with the smallest vector distance from the new instance is located, wherein the method of calculating the vector distance may include, but is not limited to, Euclidean distance, cosine distance, Marxian distance, Chebyshev distance, and/or Manhattan distance, etc.

In some embodiments, a pipe network node can be classified into one of the above classifications in the instance set of incidents due to the above feature based on its extrinsic feature. For example, the vector distance between the extrinsic feature of the pipe network node and the extrinsic feature of the cluster center is calculated, and it is classified into the corresponding classification with the closest distance to the cluster center. The extrinsic reliability degree is then determined based on the extrinsic reliability degree of the historical instances in that class. For example, the extrinsic reliability degree of each historical instance contained in the classification is averaged as the extrinsic reliability degree.

In some embodiments, the extrinsic reliability degree of the historical instances may be determined based on the interval of time between incidents caused by extrinsic features. The method of determining the extrinsic reliability degree of the historical instances is similar to the method of determining the intrinsic reliability degree of the historical instances, and the method of determining the extrinsic reliability degree of the historical instances may be found in the method of determining the intrinsic reliability degree of the historical instances.

In some embodiments, the extrinsic reliability degree may be determined based on the weighted summation of the extrinsic reliability degree of the historical instances in the cluster. In some embodiments, the weight is related to the historical data collection accuracy corresponding to the historical instances. More descriptions regarding the historical instances and the historical data collection accuracy may be found in the related descriptions above.

In some embodiments, the weight of the extrinsic reliability degree of the historical instances in the cluster may be positively related to the historical data collection accuracy. For example, if the cluster contains a historical instance 4, and a historical instance 5, wherein the historical instance 4 has a historical data collection accuracy of level 4 and the historical instance 5 has a historical data collection accuracy of level 6, then the extrinsic reliability degree weight of historical instance 4 is 0.4 and the extrinsic reliability degree weight of historical instance 5 is 0.6. The extrinsic reliability degree of the historical instances in the cluster is 0.4*extrinsic reliability degree of historical instance 4+0.6*extrinsic reliability degree of historical instance 5.

The extrinsic reliability degree is determined based on the weighted summation of the extrinsic reliability degree of the historical instances in the cluster. The determination method considers the historical data collection accuracy, causing the considered factors more comprehensive when determining the extrinsic reliability degree, and the data collection accuracy is related to the data accuracy, causing the determined extrinsic reliability degree more accurate.

In some embodiments, the extrinsic reliability degree is also related to the probability of a construction accident occurring. That is, the determination of the extrinsic reliability degree also considers the probability of a construction accident occurring.

The probability of a construction accident is the probability of an accident occurring during the construction process. The probability of a construction accident occurring can be indicated as a percentage, and the larger the percentage, the greater the probability of a construction accident occurring. In some embodiments, the probability of a construction accident occurring can be obtained by querying a safety information sheet of construction-related information, based on construction experience. In some embodiments, the probability may be determined based on similarity by comparing the current construction feature with the historical construction features at the time of the accident during historical construction. For example, if the similarity between the current construction feature and the historical construction feature is 50%, the probability of a construction accident occurring is determined to be 50%.

In some embodiments, the extrinsic reliability degree is negatively related to the probability of a construction accident occurring, e.g., the greater the probability of a construction accident occurring, the lower the extrinsic reliability degree is determined.

In some embodiments, the confirmation of the extrinsic reliability degree also requires a combination of determining the extrinsic reliability degree based on vector similarity, determining the extrinsic reliability degree based on historical instances in clustering, and the probability of a construction accident occurring corresponding to the current construction feature. For example, the probability of a construction accident can be used as a decreasing factor for the extrinsic reliability degree determined based on historical instances. The decline may be a preset value, e.g., the greater the probability of a construction accident, the greater the decline.

In some embodiments, the descent factor may further consider the relative relationship between the probability of a construction accident occurring corresponding to the current construction feature and the ratio of the probability of a construction accident corresponding to the construction feature of the historical instances. For example, the descent factor is positively related to the ratio of the probability of a construction accident occurring corresponding to the current construction feature to the probability of a construction accident occurring corresponding to the construction feature of the historical instances.

In some embodiments, the probability of a construction incident may be determined based on the overlapping of the construction feature with the anomalous terms in the set of anomalous terms. Wherein, the anomalous terms may be determined based on a frequent term algorithm.

An anomalous term is a feature that is constructed from the feature that often occurs simultaneously when a construction accident occurs. For example, the historical construction feature of a construction incident is (A, B, C, D), where A can represent the expected construction schedule, B can represent the actual construction schedule, C can represent the number of workers, and D can represent the construction device. If the historical construction feature of construction accident 1 (55, 45, 10, A), construction accident 2 (53, 36, 5, B), construction accident 3 (53, 36, 5, B), and construction accident 2 (53, 36, 5, B) are indicated as (A, B, C, D), where A can indicate the expected construction progress, B can indicate the actual construction progress, C can indicate the number of workers, and D can indicate the construction device. The feature (53, 36, 5, A), (53, 36, 5) repeatedly occurs at the same time, and if the number or percentage of occurrences exceeds the threshold, then (53, 36, 5) can be considered as an anomalous term.

In some embodiments, anomalous terms may be determined based on the occurrences number of a feature item in a historical construction features in the construction feature in which the construction incident occurred. For example, if the occurrence number of a feature item in a historical construction feature is greater than an occurrence threshold, the feature item is determined to be an anomalous term. The occurrence threshold may be specified manually, such as 5 times.

In some embodiments, the anomalous term may be determined based on a support degree of a feature term in the historical construction features in which a construction accident occurred versus in which no construction accident occurred. For example, the feature term (53, 36, 5) is determined as an anomalous term when the feature term has a forward support degree greater than a forward support degree threshold and has a reverse support degree less than the reverse support degree threshold, and it is in both construction features in which a construction accident occurred and a construction accident did not occur. The forward support degree may refer to the number of times a feature item appears in a construction feature in which a construction accident occurs, and the reverse support degree may refer to the number of times a feature item appears in a construction feature in which a construction accident does not occur. Merely as way of example, when the forward support degree threshold is set to 10 and the reverse support degree threshold is set to 5, if (53, 36, 5) occurs 20 times in the construction feature in which the construction accident occurred and (53, 36, 5) occurs 3 times in the construction feature in which the construction accident did not occur, the forward support degree 20 is greater than the forward support degree threshold 10 and the reverse support degree 3 is less than the reverse support degree threshold 5, then it may be determined that the forward support degree 20 is greater than the forward support degree threshold 10 and the reverse support degree 3 is less than the reverse support degree threshold 5. If the forward support degree 20 is greater than the forward support degree threshold 10, and the negative support degree 3 is less than the negative support degree threshold 5, then it may be determined that (53, 36, 5) is an anomalous term.

In some embodiments, the anomalous term may be determined based on a preset algorithm.

In some embodiments, the intelligent gas pipe network safety management platform may determine anomalous items based on the support degree of each feature item. The support degree may refer to the frequency of occurrence of a feature term or a feature term combination in a construction feature set in which a construction incident occurs.

Merely by way of example, the intelligent gas pipe network safety management platform may determine a second data set based on the first data set, a third data set based on a value of each data in the second data set, and an anomalous item based on the number of feature items for each data in the third data set. The value of each data in the second data set refers to the number of occurrences of that data in the first data set. Determining the third data set based on the value of each data in the second data set may include determining that the data in the second data set has a value greater than the support degree and determining that the data with a value greater than the support degree is the third data set. In some embodiments, a preset algorithm (e.g., FP-Growth, Apriori, etc.) may be configured to determine the third data set.

Merely by way of example, the whole construction feature set (i.e., the first dataset) in which a construction accident occurred has four sets, e.g., (55, 45, 10, A), (53, 36, 5, B), (53, 36, 5, A), and (53, 36, 5, C). For this construction feature set, the intelligent gas network safety management platform may obtain a plurality of k-tuples. The k-tuples may refer to a set containing k feature items (i.e., a second data set), i.e., every k adjacent elements form a k-tuple, independent of other factors (e.g., time). For example, when the k-tuples are binary, every 2 elements are a group, i.e., "(55, 45)", "(45, 10)", "(10, A)", "(10, A) "(55, 36)", "(36, 5)", "(5, B)", etc. Another example is when the k-tuple is a triple, every three adjacent elements are a group, i.e.: "(55, 45, 10)", "(45, 10, A)", "(55, 36, 5)", etc. The third data set can include all k-tuples that meet the condition. The condition is that the occurrence number of the k-tuples in the construction feature set (i.e., the first dataset) exceeds the support degree. The support degree may be preset or a default value can be used, e.g., with a support degree of 2, the third dataset can include "(55, 36)", "(36, 5)", and "(55, 36, 5)". In the third dataset, "(55, 36, 5)" covers the largest number of feature items, so the intelligent gas pipe network safety management platform can determine "(55, 36, 5)" as an anomalous item.

The overlapping degree is the extent to which the feature terms in the construction feature are identical, and can be indicated as a percentage. For example, suppose the construction feature has a total of 5 feature items, and 2 of them are the same as the corresponding items in the anomalous term items, then the overlapping degree=⅖, which is indicated as 40%. As an illustrative example only, the anomalous items in the set of anomalous items include (53, 36, 5), and when the construction feature of the current pipe network node is (50, 30, 5, A), the number of construction workers 5 in the construction feature overlapping with the number of construction workers 5 in the anomalous items, the overlapping degree=¼, which is indicated as 25%.

In some embodiments, the probability of a construction accident occurring can be positively related to the overlapping of the construction feature with the anomalous term in the set of anomalous terms. For example, the higher the overlapping between the construction feature and the anomalous term in the set of anomalous terms, the higher the probability of a construction accident occurring, which may be a numerically equal relationship or other positive correlation.

Predicting the probability of a construction accident based on a preset algorithm to determine the anomalous terms may improve the accuracy of predicting the probability of a construction accident, thereby improving the accuracy of determining the extrinsic reliability degree.

Figure 4:
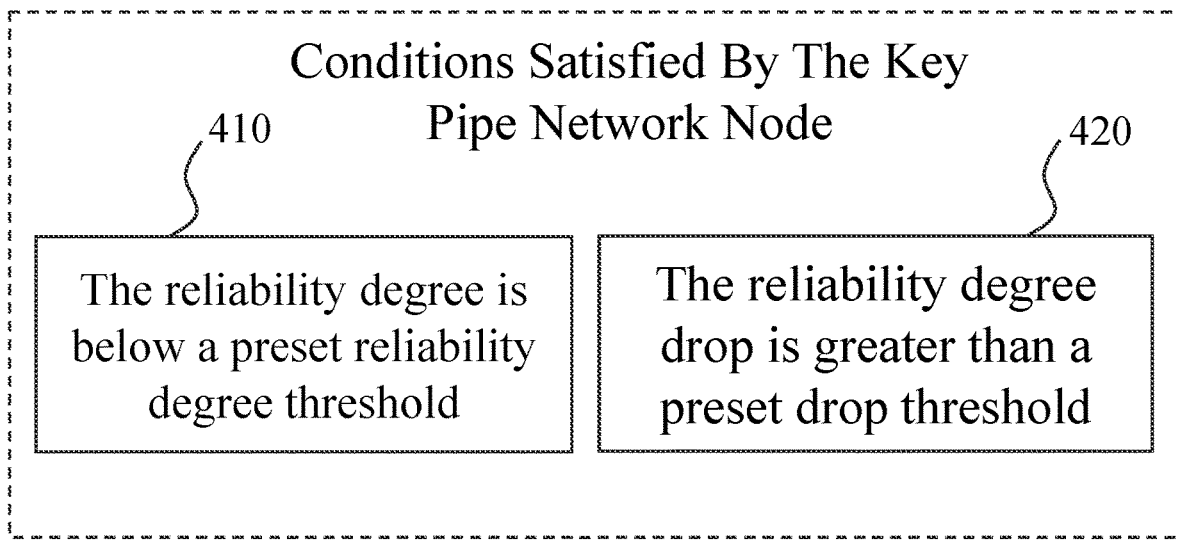
FIG. 4 is a schematic diagram illustrating conditions satisfied by the key pipe network node according to some embodiments of the present disclosure.

FIG. 4 is a schematic diagram illustrating conditions 400 satisfied by the key pipe network node according to some embodiments of the present disclosure.

In some embodiments, the key pipe network node satisfies at least one of the following conditions: the reliability degree is below a preset reliability degree threshold 410 and the reliability degree drop is greater than a preset drop threshold 420.

The preset reliability degree threshold is a preset reliability degree threshold that can be set manually based on historical experience, for example, a preset reliability degree threshold set to 60%, etc.

In some embodiments, a pipe network node is determined to be a key pipe network node when the reliability degree of the pipe network node is below a preset reliability degree threshold. For example, when the reliability degree of a pipe network node is 50%, which is below a preset reliability degree threshold (60%), the pipe network node is determined to be a key pipe network node.

The reliability degree drop is the difference between the first time point reliability degree and the second time point reliability degree of the pipe network node, i.e., the reliability degree drop is the difference (e.g., 10%) obtained by subtracting the second time point reliability degree (e.g., 60%) from the first time point reliability degree (e.g., 70%).

The preset reduction threshold is a preset reduction threshold that may be set manually based on historical experience, for example, a preset reduction threshold of 5%, etc.

The first time point reliability degree is the reliability degree determined based on the reliability degree influence feature of the pipe network node at the first time point. For example, the reliability degree corresponding to the moment t0.

The second time point reliability degree is the reliability degree determined based on the reliability degree influence feature of the pipe network node at the second time point. For example, the reliability degree corresponding to the moment t1. The first point in time is earlier than the second point in time.

In some embodiments, a pipe network node is determined to be a key pipe network node when the reliability degree drop of the pipe network node is greater than a preset drop threshold. For example, when the reliability degree drop of a pipe network node is 10%, which is greater than a preset drop threshold (5%), the pipe network node is determined to be a key pipe network node.

Judging the key pipe network node based on the reliability degree lower than the preset reliability degree threshold, and also judging the key pipe network node based on the reliability degree drop greater than the preset drop threshold, from the above two aspects, can prevent the key pipe network node from misjudgment, and improve the accuracy of judging the pipe network node.

Figure 5:
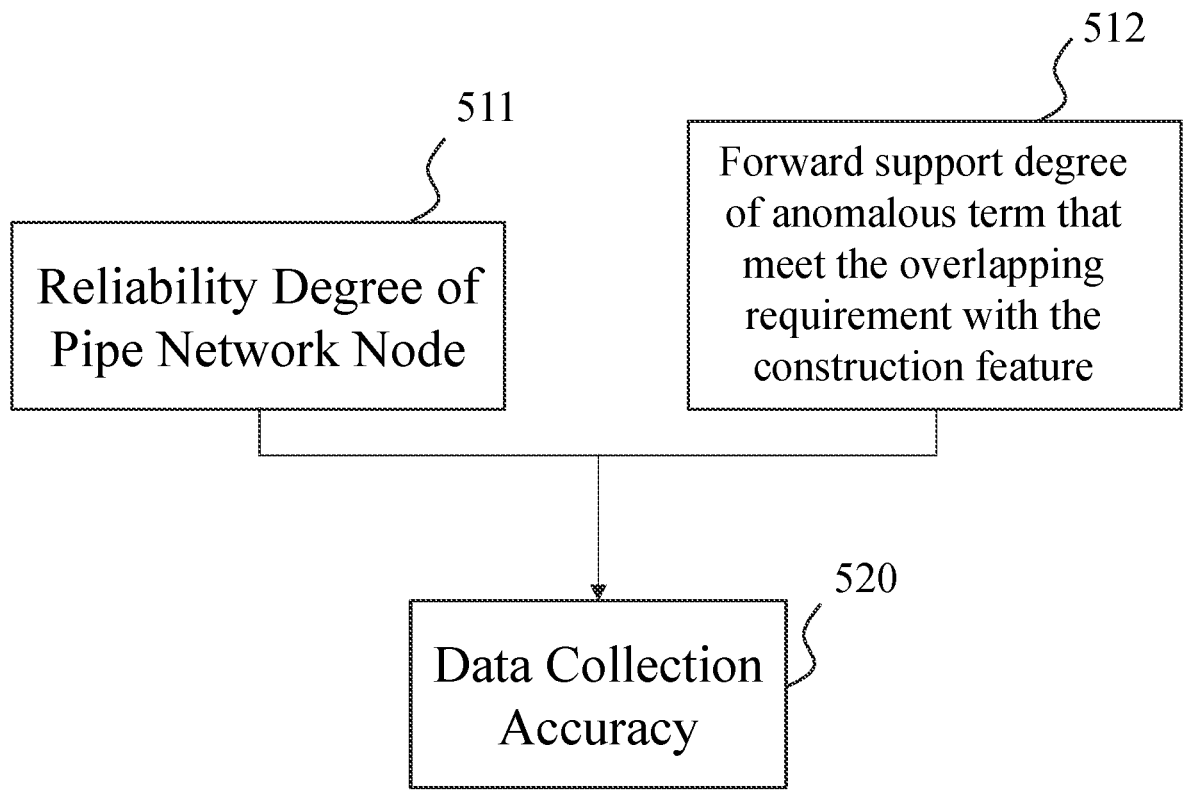
FIG. 5 is a schematic diagram illustrating influence factors of data collection accuracy according to some embodiments of the present disclosure.

FIG. 5 is a schematic diagram illustrating influence factors of data collection accuracy 500 according to some embodiments of the present disclosure.

In some embodiments, the monitoring scheme also includes a data collection accuracy 500.

The data collection accuracy refers to the fineness of the collected data, which can include the collection frequency, whether the collected data is comprehensive, etc. The data collection accuracy may be divided by level, the higher level means the higher data collection accuracy, and the upper limit of level can be set, such as level 10.

In some embodiments, the data collection accuracy 520 may be determined based on a reliability degree of pipe network node 511. e.g., the data collection accuracy is negatively related to the reliability degree, i.e., the lower the reliability degree, the higher the data collection accuracy, and the higher the reliability degree, the lower the data collection accuracy.

Determining data collection accuracy based on reliability degree enables adjusting data collection accuracy based on reliability degree, focusing on monitoring node of pipe network with low reliability degree, improving the flexibility of monitoring schemes while effectively controlling monitoring costs.

In some embodiments, a data collection accuracy 520 is also related to a forward support degree of anomalous term that meets the overlapping requirement with the construction feature 512. More descriptions regarding the anomalous terms may be found in FIG. 3 and its related descriptions.

The forward support degree of the anomalous term may refer to the frequency of the anomalous term in the construction feature where the construction accident occurred. It can be indicated as the number of times or as a percentage. The greater the forward support degree of the anomalous term, the closer the association between the anomalous term and the occurrence of construction accidents, i.e., the more likely the anomalous term is to cause a construction accident. For example, if the forward support degree of anomalous term 1 is 10 and the forward support degree of anomalous term 2 is 5, then anomalous term 1 is more likely to cause a construction accident than anomalous term 2. More descriptions regarding the forward support degree may be found in FIG. 3 and its related descriptions.

The overlapping requirement can mean greater than the overlapping threshold, and the overlapping threshold can be artificially set to 70% when the overlapping requirement is greater than 70%. More descriptions regarding the overlapping may be found in FIG. 3 and its related descriptions.

Satisfying the overlapping with the construction feature means that the overlapping between the anomalous term and the construction feature of the current pipe network node satisfies the overlapping requirement. For example, the construction feature of the current pipe network node are (80, 75, 15, A, 50), anomalous term 1 is (80, 75, 60), anomalous term 2 is (20, B, 50) and anomalous term 3 is (80, 75, 15, B, 50), anomalous term 1 is the same as 2 feature items in the construction feature of the current pipe network node, then the overlapping degree is ⅖, which is indicated as 40%, and anomalous term 2 is the same as 1 feature item in the construction feature of the current pipe network node, then the overlapping degree is ⅕, which is indicated as 20%, and anomalous term 3 is the same as 4 feature items in the construction feature of the current pipe network node, then the overlapping degree is ⅘, which is indicated as 80%. The overlapping between anomalous term 3 and the construction feature of the current pipe network node (80%) is greater than the overlapping threshold (e.g., 70%), so anomalous term 3 is an anomalous term that meets the overlapping requirement with the construction feature.

In some embodiments, the data collection accuracy may be negatively related to the forward support degree of the anomalous term that meets the overlapping requirement with the construction feature. For example, the smaller the forward support degree of the anomalous term that meets the overlapping requirement with the construction feature, the greater the determined data collection accuracy.

The smaller the forward support degree of an anomalous term item, the less closely the anomalous term item is considered to be related to the occurrence of a construction accident, so the confidence level of the reliability degree obtained from the judgment of the anomalous term item may be lower, and thus the confidence level of the data collection accuracy confirmed based on the reliability degree alone is lower. Determining the data collection accuracy based on the forward support degree of the anomalous term item can correct the adverse effect of the lower confidence of the reliability degree due to the anomalous term item with a smaller forward support degree, and thus improve the accuracy of the determined data collection accuracy.

According to the embodiments of the present disclosure, a non-transitory computer-readable storage medium on which computer instructions are stored is further disclosure, and the computer, when reading the computer instructions stored on the storage medium, executes the safety monitoring method of pipe network reliability degree based on intelligent gas.

The basic concepts have been described above, apparently, for those skilled in the art, the above-detailed disclosure is only an example, and does not constitute a limitation of the specification. Although it is not clearly stated here, technical personnel in the art may modify, improve, and amend the present disclosure. The amendments, improvements, and amendments are recommended in the present disclosure, so the amendments, improvements, and amendments still belong to the spirit and scope of the demonstration embodiments of the present disclosure.

At the same time, the present disclosure uses a specific word to describe the embodiments of the present disclosure. For example, "one embodiment", "an embodiment", and/or "some embodiments" means a feature, structure, or feature of at least one embodiment related to the present disclosure. Therefore, it should be emphasized and noted that in the present disclosure, "one embodiment" or "an embodiment" or "an alternative embodiment" that are mentioned in different positions in the present disclosure do not necessarily mean the same embodiment. In addition, some features, structures, or features of one or more embodiments in the present disclosure may be properly combined.

In addition, unless the claims are clearly stated, the order of the processing elements and sequences, the use of digital letters, or the use of other names described in this description are not used to limit the order and method of the present disclosure process and method. Although in the above disclosure, some examples are discussed through various examples that are currently considered useful, it should be understood that these classifications of details are only explained. The additional claims are not limited to the implementation examples of the disclosure. The requirements are required to cover all the amendments and equivalent combinations that meet the essence and scope of the implementation of the present disclosure. For example, although the implementation of various components described above may be embodied in a hardware device, it may further be implemented as a software-only solution, e.g., an installation on an existing server or mobile device.

In the same way, it should be noted that, to simplify the statement of the disclosure and help the understanding of one or more embodiments, in the descriptions of the embodiments of the present disclosure, sometimes multiple features will be attributed to one embodiment, figures, or its descriptions. However, this disclosure method does not mean that the feature required by the object of this description is more than the feature mentioned in the claims. Rather, claimed subject matter may lie in less than all features of a single foregoing disclosed embodiment.

Some embodiments use numbers with description ingredients and attributes. It should be understood that the number described by the embodiment is used in some examples. Modify. Unless otherwise stated, "approximately", "approximate", or "generally" indicates that the count of numbers allows ±20% of changes. Correspondingly, in some embodiments, the value parameters used in the manual and claims are similar values. The approximate value can be changed according to the feature of individual embodiments. In some embodiments, the numerical parameters should consider the effective digits specified and use the method of general digits. Although some embodiments of the present disclosure are used to confirm the range and parameters of its range breadth, in the specific embodiment, the setting of such values is as accurate as possible within the feasible range.

Each patent, patent application, patent application public, and other materials cited for the present disclosure, such as articles, books, instructions, publications, documents, etc., are hereby incorporated into this instruction as a reference. Except for the inconsistent content of the present disclosure or the application history documents, there are no restricted documents (currently or attached to the present disclosure) with the widest range of claims for this instruction. It should be explained that if the use of description, definition, and/or terminology in this instruction manual is inconsistent or in conflict with the content described in this description, the use of the description, definition, and/or terms of the present disclosure shall prevail as shall prevail.

Finally, it should be understood that the embodiments described in the present disclosure are only used to illustrate the principle of the embodiments of this description. Other deformation may further belong to the scope of the present disclosure. Therefore, as an example, rather than restrictions, the replacement configuration of the embodiment of the present disclosure may be consistent with the teaching of the present disclosure. Correspondingly, the embodiments of the present disclosure are not limited to the implementation and description of the present disclosure.

What is claimed is:

1. A safety monitoring method of intelligent gas pipe network reliability degree, executed by an intelligent gas pipe network safety management platform of a safety monitoring Internet of Things system of pipe network reliability degree, comprising:

obtaining a reliability degree influence feature of a pipe network node from an intelligent gas pipe network sensor network platform, wherein the intelligent gas pipe network sensor network platform includes an intelligent gas pipe network maintenance engineering sensor network sub-platform, wherein the reliability degree influence feature includes at least one of an intrinsic feature, or an extrinsic feature; the intrinsic feature includes a pipe network feature, an operation feature, and a maintenance feature, and the extrinsic feature includes a climate feature and a construction feature; wherein the operation feature includes rated operation parameters of a gas pipe network and actual operation parameters, the rated operation parameters are obtained from the storage device or a database, and the actual operation parameters are obtained through sensors; wherein the climate feature is obtained from sensors deployed in environment surrounding the gas pipe network;

determining reliability degree of the pipe network node based on the reliability degree influence feature;

determining a monitoring scheme based on the reliability degree of the pipe network node, wherein the monitoring scheme includes a key pipe network node to be monitored and a data collection accuracy, wherein the data collection accuracy refers to a fineness of collected data; and sending the monitoring scheme and pipe network risk reminder information to a supervision user sub-platform in an intelligent gas user platform based on an intelligent gas service platform, wherein the intelligent gas user platform is configured as a terminal device, and a supervision user obtains the monitoring scheme by the terminal device; wherein the intelligent gas service platform is further configured to receive query instructions sent by the intelligent gas user platform; and the intelligent gas pipe network maintenance engineering sensor network sub-platform is configured to send remote scheduling management information to the intelligent gas pipe network maintenance engineering object sub-platform in an intelligent gas pipe network, and receive execution feedback from the intelligent gas pipe network maintenance engineering object sub-platform;

wherein the reliability degree includes an intrinsic reliability degree and an extrinsic reliability degree; and the determining the reliability degree of the pipe network node based on the reliability degree influence feature includes:

determining the intrinsic reliability degree of the pipe network node based on the intrinsic feature of the pipe network node;

classifying the pipe network node into a cluster in an instance set of incidents due to the extrinsic feature based on the extrinsic feature of the pipe network node, wherein the cluster is determined based on a preset clustering algorithm, wherein the preset clustering algorithm is executed by the intelligent gas pipe network safety management platform, wherein the intelligent gas pipe network safety management platform refers to a platform that arranges and coordinates connection and collaboration between a plurality of functional platforms, converges all information of the Internet of Things, and provides functions of perception management and control management for the safety monitoring Internet of Things system;

determining the extrinsic reliability degree of the pipe network node based on a weighted summation of extrinsic reliability degrees of historical instances in the cluster, wherein a weight of the weighted summation is positively related to a historical data collection accuracy corresponding to the historical instances; and by determining a probability of occurring a construction accident as a decreasing factor, obtaining a decreased extrinsic reliability feature of the pipe network node by decreasing the extrinsic reliability feature of the pipe network node, wherein the probability of occurring the construction incident is determined based on an overlapping of the construction feature with an anomalous term in a set of the anomalous terms, the anomalous term is a feature term that is constructed from features that often occur simultaneously when the construction incident occurs.

2. The safety monitoring method of claim 1, wherein the obtaining a reliability degree influence feature of a pipe network node includes:

obtaining at least part of the intrinsic feature based on a collection frequency, wherein the collection frequency is related to operation frequency of construction.

3. The safety monitoring method of claim 1, wherein the key pipe network node satisfies at least one of the following conditions including:

the reliability degree is below a preset reliability degree threshold; and a reliability degree drop is greater than a preset drop threshold, wherein the reliability degree drop is a difference between a first time point reliability degree and second time point reliability degree of the pipe network node; the first time point reliability degree and the second time point reliability degree are determined based on reliability degree influence features of the pipe network node at a first time point and at a second time point, respectively; and the first time point is earlier than the second time point.

4. The safety monitoring method of claim 1, wherein the intelligent gas pipe network object platform is configured to obtain the reliability degree influence feature of the pipe network node and transmit the reliability degree influence feature to the intelligent gas pipe network safety management platform through the intelligent gas pipe network sensor network platform.

5. A non-transitory computer-readable storage medium on which computer instructions are stored, wherein the computer, when reading the computer instructions stored on a storage medium, executes the safety monitoring method of intelligent gas pipe network reliability degree of claim 1.

6. A safety monitoring Internet of Things system of pipe network reliability degree, comprising: an intelligent gas user platform, an intelligent gas service platform, an intelligent gas pipe network safety management platform, an intelligent gas pipe network sensor network platform, and an intelligent gas pipe network object platform, wherein the intelligent gas pipe network sensor network platform includes an intelligent gas pipe network maintenance engineering sensor network sub-platform, and the intelligent gas pipe network object platform includes an intelligent gas pipe network maintenance engineering object sub-platform; wherein the intelligent gas pipe network object platform is configured to:

obtain a reliability degree influence feature of a pipe network node from the intelligent gas pipe network sensor network platform, and transmit the reliability degree influence feature to the intelligent gas pipe network safety management platform through the intelligent gas pipe network sensor network platform; wherein the reliability degree influence feature includes at least one of an intrinsic feature or an extrinsic feature; the intrinsic feature includes a pipe network feature, an operation feature, and a maintenance feature, and the extrinsic feature includes a climate feature and a construction feature; wherein the operation feature includes rated operation parameters of a pas pipe network and actual operation parameters, the rated operation parameters are obtained from the storage device or a database, and the actual operation parameters are obtained through sensors; wherein the climate feature is obtained from sensors deployed in environment surrounding the gas pipe network;

the intelligent gas pipe network safety management platform is configured to:

determine the reliability degree of the pipe network node based on the reliability degree influence feature; and determine a monitoring scheme based on the reliability degree of the pipe network node, wherein the monitoring scheme includes a key pipe network node to be monitored and a data collection accuracy, wherein the data collection accuracy refers to a fineness of collected data;

the intelligent gas service platform is configured to send the monitoring scheme and pipe network risk reminder information to a supervision user sub-platform in an intelligent gas user platform, wherein the intelligent gas user platform is configured as a terminal device, and a supervision user obtains the monitoring scheme by the terminal device; wherein the intelligent gas service platform is further configured to receive query instructions sent by the intelligent gas user platform; and the intelligent gas pipe network maintenance engineering sensor network sub-platform is configured to send remote scheduling management information to the intelligent gas pipe network maintenance engineering object sub-platform, and receive execution feedback from the intelligent gas pipe network maintenance engineering object sub-platform;

wherein the reliability degree includes an intrinsic reliability degree and an extrinsic reliability degree; and to determine the reliability degree of the pipe network node based on the reliability degree influence feature, the intelligent gas pipe network safety management platform:

determine the intrinsic reliability degree of the pipe network node based on the intrinsic feature of the pipe network node;

classify the pipe network node into a cluster in an instance set of incidents due to the extrinsic feature based on the extrinsic feature of the pipe network node, wherein the cluster is determined based on a preset clustering algorithm, wherein the preset clustering algorithm is executed by the intelligent gas pipe network safety management platform, wherein the intelligent gas pipe network safety management platform refers to a platform that arranges and coordinates connection and collaboration between a plurality of functional platforms, converges all information of Internet of Things, and provides functions of perception management and control management for the safety monitoring Internet of Things system;

determine the extrinsic reliability degree of the pipe network node based on a weighted summation of extrinsic reliability degrees of historical instances in the cluster, wherein a weight of the weighted summation is positively related to a historical data collection accuracy corresponding to the historical instances; and by determining a probability of a construction accident as a decreasing factor, obtain a decreased extrinsic reliability feature of the pipe network node by decreasing the extrinsic reliability feature of the pipe network node, wherein the probability of occurring the construction incident is determined based on an overlapping of the construction feature with an anomalous term in a set of the anomalous terms, the anomalous term is a feature term that is constructed from features that often occur simultaneously when the construction incident occurs;

the intelligent gas pipe network safety management platform is configured to transmit the monitoring scheme to the intelligent gas service platform; and the intelligent gas service platform is configured to feed the monitoring scheme back to a user through the intelligent gas user platform.

7. The safety monitoring Internet of Things system of claim 6, wherein the intelligent gas user platform further comprises a gas user sub-platform;

wherein the intelligent gas service platform includes an intelligent gas service sub-platform corresponding to the gas user sub-platform, and an intelligent supervision service sub-platform corresponding to the supervision user sub-platform;

the intelligent gas pipe network safety management platform includes an intelligent gas pipe network risk assessment management sub-platform and an intelligent gas data center; wherein the intelligent gas pipe network risk assessment management sub-platform includes a pipe network basic data management module, a pipe network operation data management module, and a pipe network risk assessment management module;

the intelligent gas pipe network sensor network platform further includes an intelligent gas pipe network device sensor network sub-platform; and the intelligent gas pipe network object platform further includes an intelligent gas pipe network device object sub-platform.

* * * * *